United States Patent
Ceré

(10) Patent No.: US 9,891,120 B2
(45) Date of Patent: Feb. 13, 2018

(54) MEASURING DEVICE, SYSTEM AND METHOD FOR MEASURING A WRAPPING FORCE

(71) Applicant: AETNA GROUP S.P.A., Verucchio (IT)

(72) Inventor: Mauro Ceré, Loiano (IT)

(73) Assignee: AETNA GROUP S.P.A., Villa Verucchio (Rimini) (IT)

( * ) Notice: Subject to any disclaimer, the term of this patent is extended or adjusted under 35 U.S.C. 154(b) by 0 days.

(21) Appl. No.: 15/307,941

(22) PCT Filed: Apr. 30, 2015

(86) PCT No.: PCT/IB2015/053151
§ 371 (c)(1),
(2) Date: Oct. 31, 2016

(87) PCT Pub. No.: WO2015/166447
PCT Pub. Date: Nov. 5, 2015

(65) Prior Publication Data
US 2017/0052075 A1     Feb. 23, 2017

(30) Foreign Application Priority Data
May 2, 2014    (IT) .............................. BO2014A0255

(51) Int. Cl.
*G01L 1/20*    (2006.01)
*B65B 11/04*   (2006.01)
*B65H 18/26*   (2006.01)

(52) U.S. Cl.
CPC .............. *G01L 1/20* (2013.01); *B65B 11/045* (2013.01); *B65H 18/26* (2013.01);
(Continued)

(58) Field of Classification Search
CPC ......... G01L 1/20; B65B 11/045; B65B 67/08; B65H 18/26
(Continued)

(56) References Cited

U.S. PATENT DOCUMENTS

| 4,458,467 A | 7/1984 | Shulman et al. |
| 5,522,203 A * | 6/1996 | Lancaster, III ......... B29C 55/08 53/399 |

(Continued)

FOREIGN PATENT DOCUMENTS

EP    1 083 126    3/2001

OTHER PUBLICATIONS

International Search Report dated Aug. 31, 2015 in International (PCT) Application No. PCT/IB2015/053151.

*Primary Examiner* — Lisa Caputo
*Assistant Examiner* — Octavia Hollington
(74) *Attorney, Agent, or Firm* — Wenderoth, Lind & Ponack, L.L.P.

(57) ABSTRACT

A measuring device for detecting and measuring a wrapping force of a stretchable plastic material film wrapped around a load includes a first angular element that can be associated and fixed to at least one of an edge and a flat wall of the load, at least one force sensor fixed to the first angular element, a second angular element fixed to, and supported by, the force sensor, and a control unit connected to the force sensor and arranged for receiving therefrom a signal related to a wrapping force exerted by the film on the second angular element by the film that is wrapped around the load and around the measuring device. A system for detecting and measuring a wrapping force of a stretchable plastic material film wrapped around a load includes one or more measuring devices associated with, and fixed to, the load at edges and/or at flat walls of the load and an external receiving unit that is (Continued)

arranged for receiving signals which are transmitted by the measuring devices and related to a wrapping force exerted by the film wrapped around the load and around the measuring devices.

15 Claims, 5 Drawing Sheets

(52) U.S. Cl.
CPC ............... *B65H 2301/5124* (2013.01); *B65H 2513/106* (2013.01); *B65H 2515/31* (2013.01); *B65H 2701/1944* (2013.01)

(58) Field of Classification Search
USPC .................................................... 73/862.393
See application file for complete search history.

(56) References Cited

U.S. PATENT DOCUMENTS

| | | | | |
|---|---|---|---|---|
| 5,836,140 A * | 11/1998 | Lancaster, III | ....... | B65B 11/025 53/389.4 |
| 6,370,839 B1 | 4/2002 | Nakagawa et al. | | |
| 7,114,308 B2 * | 10/2006 | Cox | ....... | B65B 11/045 53/399 |
| 8,001,745 B2 * | 8/2011 | Carter | ....... | B65B 11/025 53/389.4 |
| 8,453,420 B2 * | 6/2013 | Schmidt | ....... | B65B 11/025 53/441 |
| 9,555,912 B2 * | 1/2017 | Cere' | ....... | B65B 11/025 |
| 2010/0300049 A1 | 12/2010 | Schmidt et al. | | |
| 2015/0101281 A1 * | 4/2015 | Kudia | ....... | B65B 57/12 53/51 |

* cited by examiner

MEASURING DEVICE, SYSTEM AND METHOD FOR MEASURING A WRAPPING FORCE

The invention relates to devices and instruments for detecting and measuring a wrapping force of a film made of stretchable plastic material wrapped around a load by a wrapping machine. In particular, the invention relates to a measuring device applicable to a load and to a system and method which use such measuring device for detecting a wrapping or tightening tension or strength of the plastic film wrapped around a load.

The known, fixed or self-propelled, wrapping machines comprise an unwinding apparatus which supports a reel from which the plastic film is unwound for being wrapped around the load so as to form a series of partially overlapped strips or bands having a helical arrangement, thanks to the combination of the vertical movement of the unwinding apparatus and the relative rotation between the unwinding apparatus and the load. The load is typically composed by one or more products or objects grouped and arranged on a bench or vane or pallet.

In the self-propelled wrapping machines the unwinding apparatus is vertically mobile along a column mounted on a vehicle that is mobile around the load.

In the wrapping machines provided with a rotating table for supporting the load, the latter is rotated around a vertical axis, while the unwinding apparatus is vertically moved with alternated motion along a fixed column.

In the wrapping machines with horizontal rotating ring or rotating arm, the load remains static during the wrapping, while the unwinding apparatus is moved relatively to the load both in rotation around the vertical axis and in translation along the latter. For this purpose, the unwinding apparatus is fixed to a ring or to an arm, which are rotatably supported by a fixed structure of the machine so as to rotate around the load.

In the wrapping machines with vertical rotating ring, the load is horizontally moved through the ring, while the unwinding apparatus is fixed to the ring and rotated around a horizontal axis.

The unwinding apparatus typically comprises a couple of pre-stretching rollers arranged for unwinding the film from the roll and stretching or elongating the film, and one or more diverting or return rollers arranged for diverting the film toward the load. By suitably adjusting the difference between the rotation speeds of the pre-stretching rollers, it is possible to stretch by a given amount the film coming out from the unwinding apparatus. The film stretching is generally expressed in percentage as the ratio between the film elongation (i.e. the difference between the final length of the stretched film and the original length) and the original length. Typically, the elongation imparted to the film is comprised between 50 and 400%.

By adjusting the rotation speed of the pre-stretching rollers it is also possible to vary the unwinding speed of the film from the reel, that is the speed of the film coming out from the unwinding apparatus.

The plastics film is stretched before being wrapped around the load as the stretching or elongation allows to best use the film and give to the latter physical-mechanical characteristics such as to make the film more suitable to stand the forces acting on the load during the subsequent handlings and transport. In particular, when the stretching force ceases, the film elastic return causes a wrapping or blocking tension or force on the load, which ensures the containment of the latter.

The wrapping force of the film is an important operating parameter whose value strictly depends both on shape and arrangement of the products which are grouped on the pallet and on the products types themselves. The value of the wrapping force in fact has to be such as to ensure the stability and solidity of the wrapped load during all the handling and transporting steps thereof. In other words, the film wrapped around the load, when the load is subjected to dynamic and/or physical stress, such as acceleration, vibration, temperature variations, etc., has not to loosen and/or to allow relative displacements of the products and/or a deformation and instability of same load. As a result of a strong deformation, the load can also collapse, consequently damaging the products and/or making impossible to handle the load afterward.

The wrapping force has to be therefore sufficiently high to ensure the wrapping stability, but not such as to crush and/or damage the products grouped on the pallet. In some cases, the above mentioned products have shape and composition (material, structure) such as to be easily deformable when too tightly wrapped by the film.

Finally, the values of the wrapping force has to be substantially constant along the whole perimeter of the load in order to not create torsional forces on the latter that could cause a deformation of the load.

The need to find a value of the film wrapping force which allows a correct and stable wrapping of the load without damaging the products or deforming the load, forces the manufacturers of wrapping machines and/or the final users to carry out preventive tests on the loads to be wrapped.

However such tests are particularly long and laborious. In fact, once identified the optimum value or range of values of the wrapping force for a particular type of product (form, structure, material) that are grouped to form a particular load (width, length, height), it is necessary to adjust each wrapping machine which has to wrap such load, in order to obtain the desired value of the wrapping force by acting on the speed wrapping and/or the film stretching.

The wrapping force is measured by detecting the force required to detach the wrapped film from the load. Typically, a special measuring instrument is used for performing this measurement, which is previously wrapped by the film together with the load or subsequently inserted between the wrapping bands or strips of the film, the measuring instrument being rotated on itself by linearly moving it along a load wall.

Alternatively, the measuring instrument comprises a plate also inserted between the bands of the film and then detached from the load in a direction orthogonal to a wall thereof. By measuring the force required to move the measuring instrument (for rotating or detaching the measuring instrument) it is possible to calculate the tightening force of the film around the load with a dynamometer. However, these fully manual measuring methods are long, laborious and subject to errors as these measuring methods are performed by an operator.

Furthermore, many wrapping tests have to be performed before obtaining the desired value of the wrapping force with a consequent waste of time and resources.

An object of the invention is to improve the known measuring devices and the known systems and methods for measuring a wrapping force or tension of a film made of stretchable plastic material wrapped around a load.

Another object is to provide a measuring device associable with a load to be wrapped and a related measuring system and method, which allow to detect and measure in a fast, simple and precise manner a wrapping force exerted on the load by the wrapped film.

A further object is to provide a device, a system and a method that allow to detect and measure in real time during the wrapping process the wrapping force of the film on the load in any point thereof.

Another object is to carry out a modular measuring device, which is both associable and usable on any shaped and sized loads to be wrapped with film.

Another further object is to carry out a robust and reliable measuring device having a simple and economical manufacture.

In a first aspect of the invention a measuring device is provided.

In a second aspect of the invention a measuring system comprising the measuring device of the first aspect is provided.

In a third aspect of the invention a measuring method according to the measuring system of the second aspect is provided.

The invention can be better understood and implemented with reference to the attached figures, which illustrate an exemplifying and non-limiting embodiment, wherein.

Figures 1, 2:
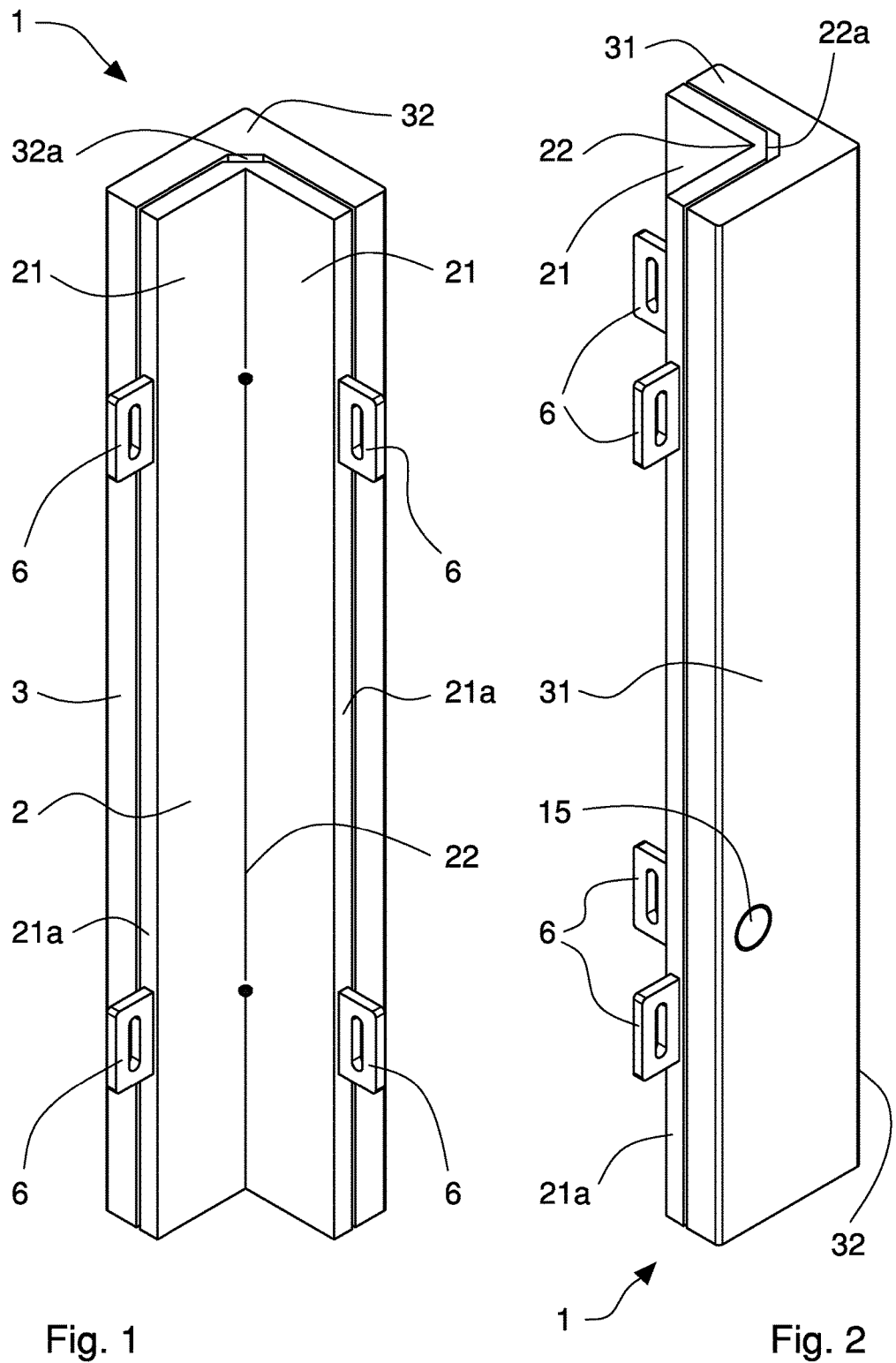
FIG. 1 is a front perspective view of the measuring device according to the invention.
FIG. 2 is a rear perspective view of the device of FIG. 1.
Figure 3:
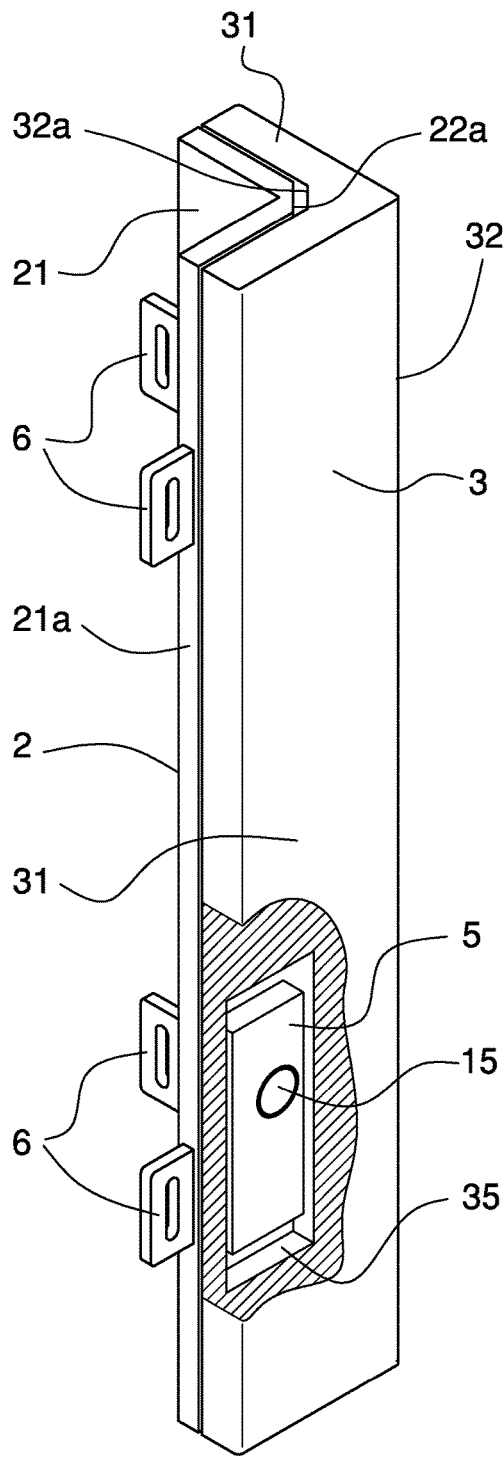
FIG. 3 is a rear perspective view, partially sectioned, of the device of FIG. 1, showing a control unit.
Figure 4:
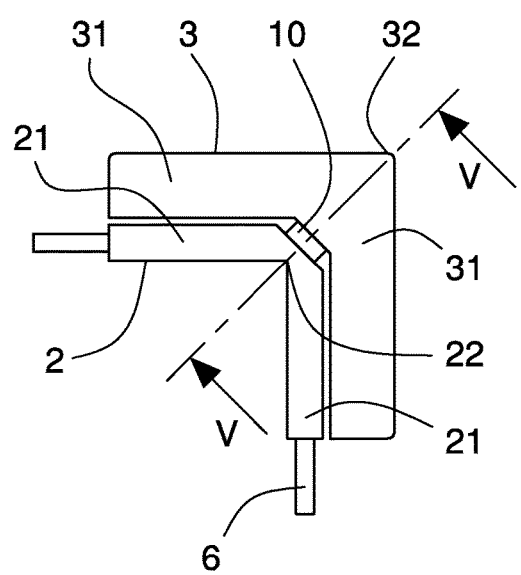
FIG. 4 is a plan view of the device of FIG. 1.
Figure 5:
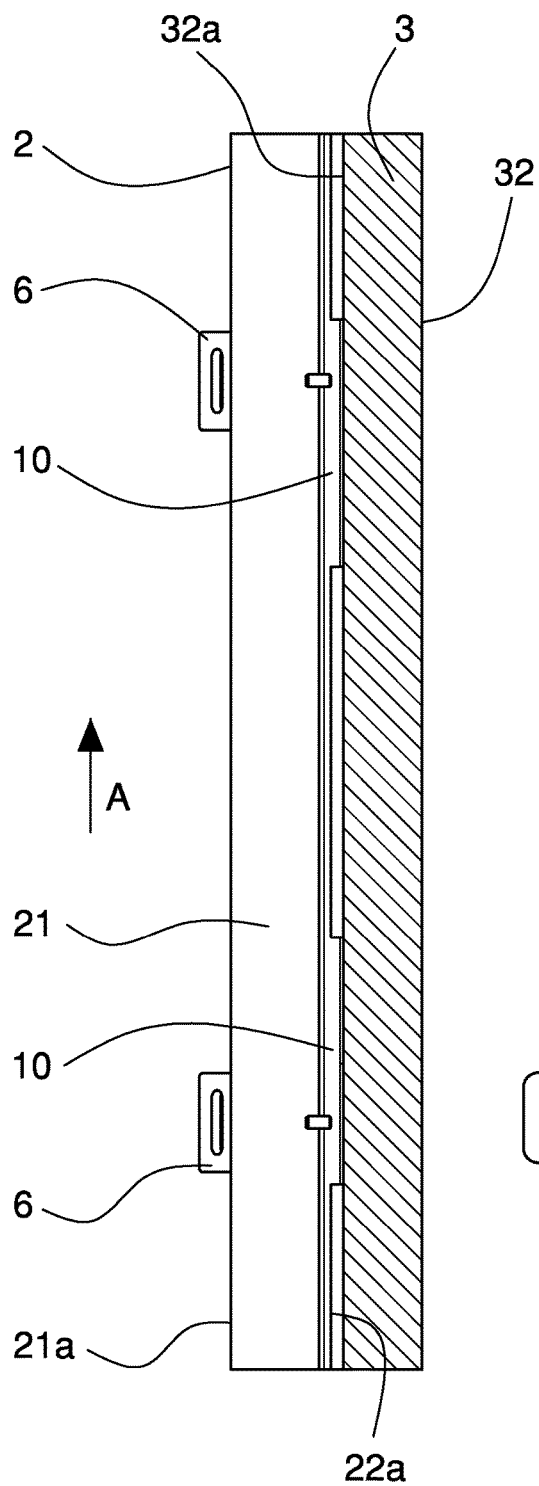
FIG. 5 is a section along the line V-V of FIG. 4.
Figure 6:
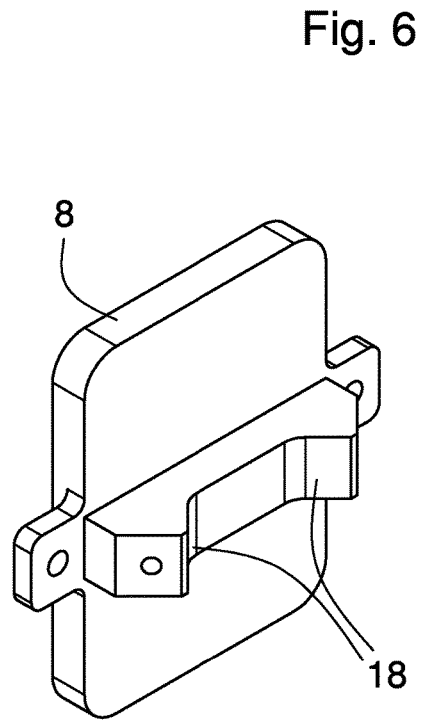
FIGS. 6 and 7 are respectively a perspective view and a front view of a supporting element for mounting the measuring device of the invention on a load.
Figure 7:
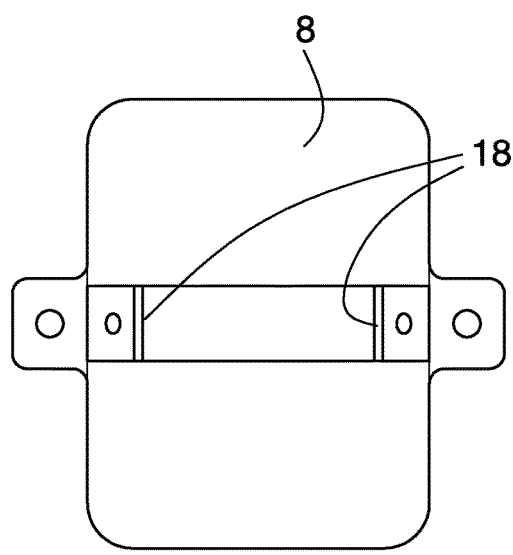

With reference to FIGS. 1 to 10, a measuring device 1 is shown according to the invention for detecting and measuring a tightening or wrapping force F of a film 50 made of stretchable plastic material that is wrapped around a load 100 by a wrapping machine 60.

The device 1 comprises an elongated first angular element 2 that can be associated to a portion of the load 100, one or more force sensors 10, for example two, that are fixed to the first angular element 2 and mutually spaced apart along a longitudinal extending direction A of the first angular element 2, a substantially elongated second angular element 3 that is fixed to, and supported by, said force sensors 10, and a control unit 5 that is connected to the force sensors 10 and arranged to receive from the latter ones a signal that is related to a wrapping force F exerted to the second angular element 3 by the film 50 wrapped around both the load 100 and the device 1 that is fixed thereon before the wrapping.

The first angular element 2 comprises a stiff metallic section bar, for example made of aluminum alloy, having an "L" cross section and formed by two first flat portions 21 substantially orthogonal to each other and joined at a first joining edge 22.

The force sensors 10, for example two, are fixed to the first angular element 2 at and along the first joining edge 22.

For this purpose, the first joining edge 22 has a flat outer face 22a that is arranged to receive the respective sensors force 10.

The second angular element 3 comprises a metal section bar, for example made of aluminum alloy, also having a "L" cross section and composed by two second flat portions 31 substantially orthogonal to each other and joined at a second joining edge 32. The second angular element 3 is fixed to the force sensors 10 along an inner face 32a of the second flat joining edge 32.

The force sensors 10 include, for example, respective load cells or equivalent force transducers, of known type and not described and illustrated in detail in the figures.

The device 1 further comprises a fixing arrangement 6, 7 for hooking the device to the load 100.

In the illustrated embodiment, the fixing arrangement comprises a plurality of hooks 6 mutually spaced apart and fixed to longitudinal borders 21a of the first angular element 2 and flexible elements 7 removably connected to the hooks 6 and can be wrapped around the load 100. In particular, the hooks 6 are orthogonally fixed to the longitudinal borders 21a. The flexible elements 7 comprises elastic or non-stretchable belts that are fixed to the hooks 6 by elastic elements.

The fixing arrangement 6, 7 allows the device 1 to be fixed firmly to the load 100 in the desired position wherein one wants to measure the wrapping force of the film.

As shown in the figures, the shape of the measuring device 1 that comprises two angular elements 2, 3, allows an easy and stable positioning thereof along the longitudinal edges 101 of the load 100. The measuring device 1 can also be positioned on a flat wall 102 of the load 100 by arranging the longitudinal borders 21a of the first angular element 2 facing the flat wall 102.

A supporting element 8 is also provided for associating the device 1 to the flat wall 102 and for facilitating and making stable its positioning. The supporting element 8 comprises a plate provided with a seat 18 adapted to be coupled with the longitudinal borders 21a of the first angular element 2.

The device 1 can be provided with connecting elements of known type and not shown in the figures, which are positioned at the opposite ends of the first angular element 2 and which can be coupled in a reversible manner with respective connection elements of another device 1. The connection elements makes the device 1 modular, allowing in this manner to connect in series a plurality of measuring devices 1, according to the size of the load 100, for example according to the length of the longitudinal edge 101.

The control unit 5 is fixed inside a cavity 35, which is carried out on one of the second flat portions 31 of the second angular element 3, and comprises a unit for electrically powering the force sensors 10, a unit for receiving and processing the signal received by the force sensors 10 and a transmitting unit for wireless transmitting the signal to an external receiving unit 45, i.e. a desktop or a laptop computer, a data mobile transceiver such as a tablet, a smartphone, etc. The transmitting unit can transmit over radio frequency by Wi-Fi or Bluetooth technology.

The control unit 5 is powered by batteries and includes a power button 15, which can be easily activated by the user.

Figure 8:
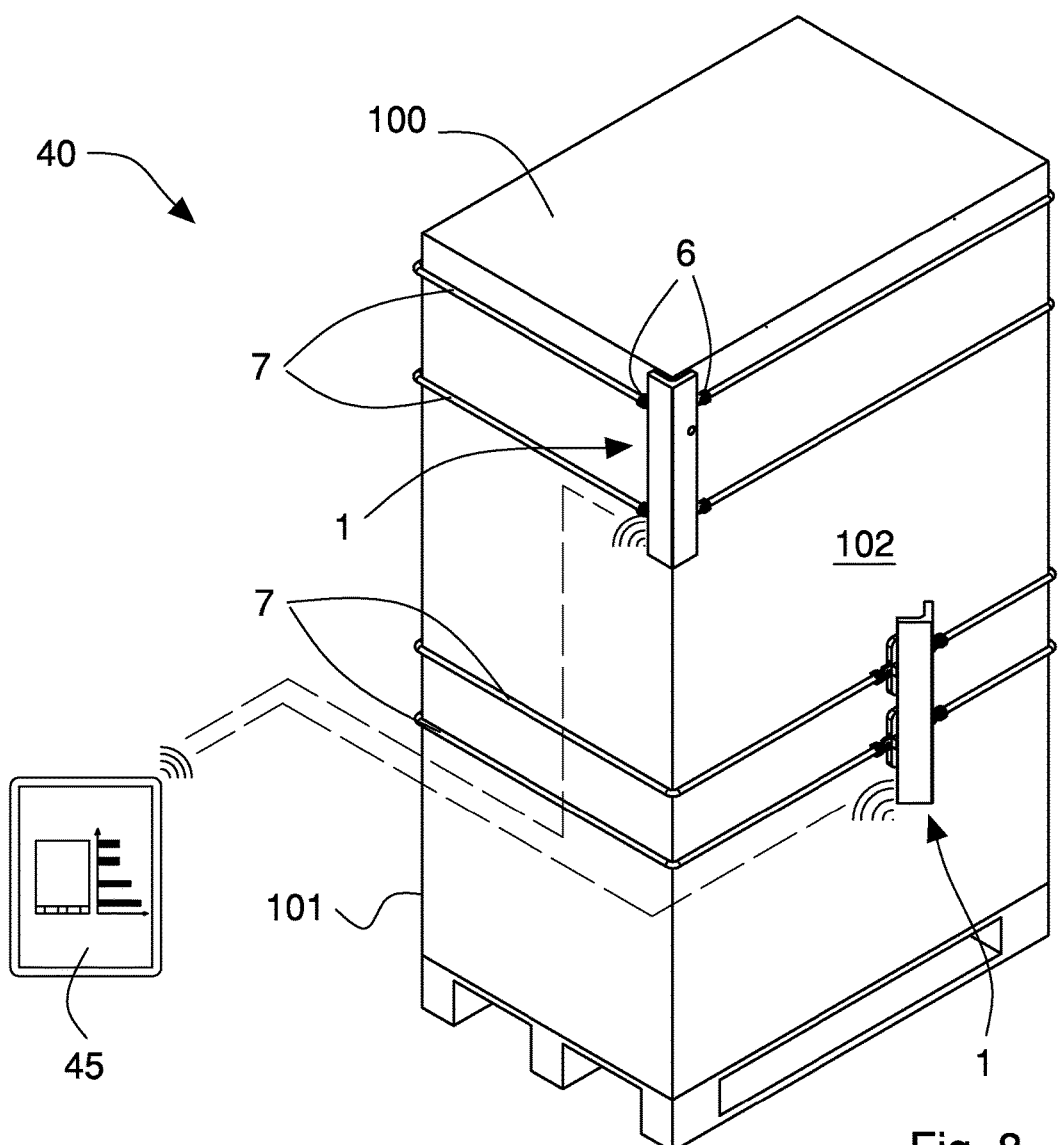
FIG. 8 is a perspective view of a measuring system of the invention comprising a plurality of devices of FIG. 1 and associated to a load to be wrapped.
Figure 9:
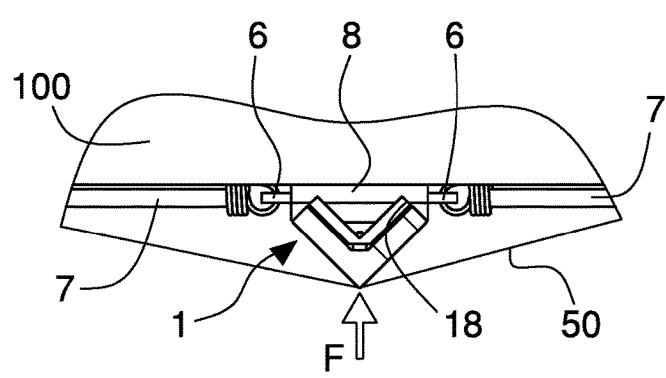
FIG. 9 is an enlarged partial plan view of the system and the load of FIG. 8.
Figure 10:
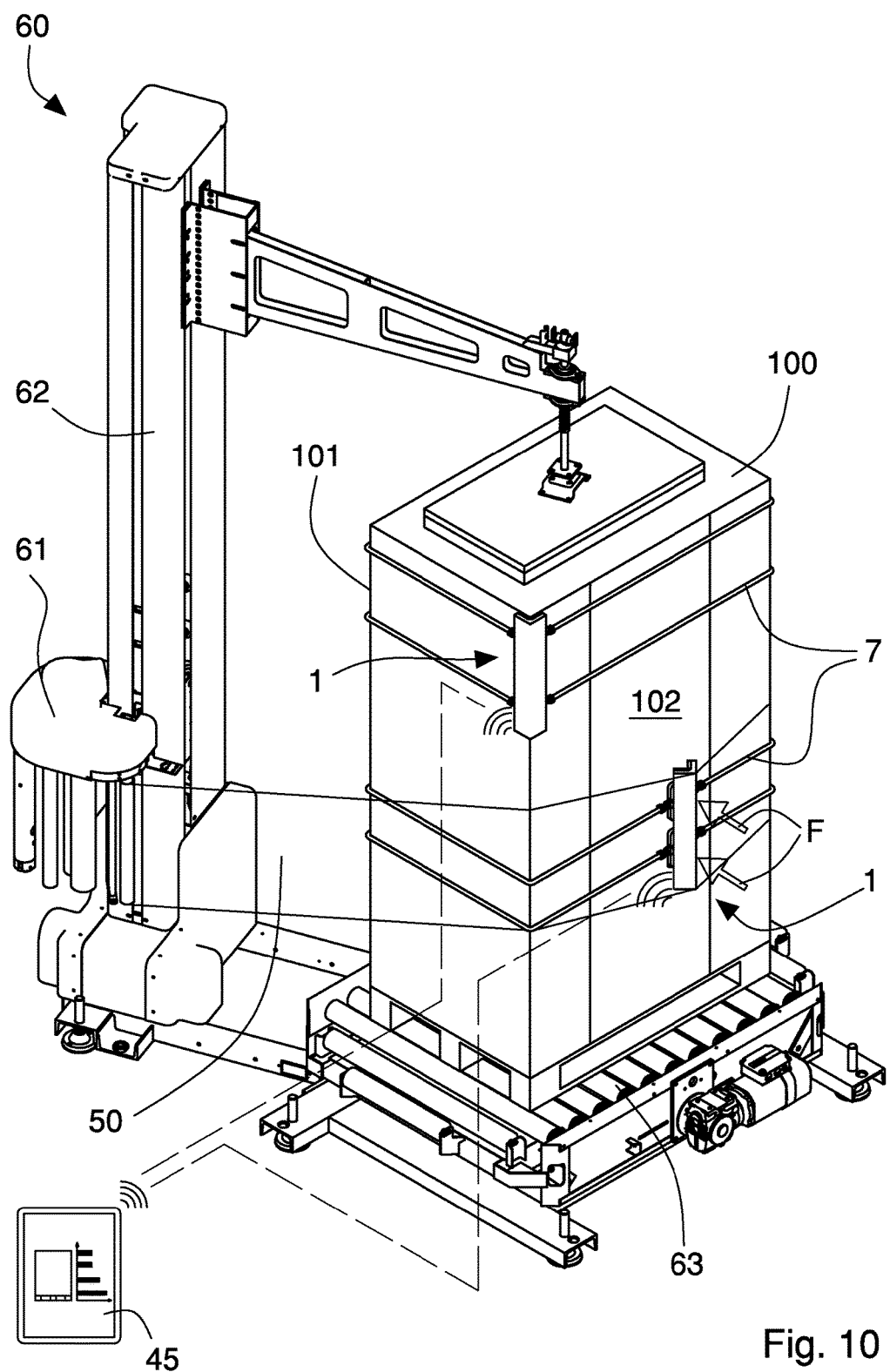
FIG. 10 is a perspective view of the measuring system of the invention applied to a load and to a wrapping machine with rotating table.

With particular reference to FIGS. 8 to 10, the measuring system 40 according to the invention and arranged to detect and measure a wrapping force F of a film 50 of stretchable plastic material wrapped around a load 100, comprises one or more measuring devices 1, for example two in the illustrated embodiment, that are associated and fixed to the load 100 at an edge 101 and a flat wall 102 of the latter, and an external receiving unit 45, arranged for receiving the signal that is transmitted by the measuring devices 1 and related to the wrapping forces 50 exerted by the film F wrapped on the load 100 and the measuring devices 1.

The measuring devices 1, suitably fixed to the pallet 100 before the wrapping process, are capable to detect and measure in real time during the wrapping of the film 50 the wrapping or tightening force that is exerted by the film at various points of the pallet 100, in which points said devices 1 are positioned. In particular, each measuring device 1 transmits the two values of the wrapping force measured by the two force sensors 10.

The wrapping force F varies during the wrapping and assumes different values at different points of the load (longitudinal edges 101, flat walls 102).

Thanks to the measuring device 1 and the measuring system 40 of the invention is thus possible to accurately and precisely measure, in real time, during the wrapping of the load 100, the wrapping force F and to act in feedback on the wrapping machine 40. In particular, it is possible to change the operating parameters of the wrapping machine 60 in order to vary the wrapping force F exerted by the film 50 till reaching a predefined value of said wrapping force that guarantees stability and firmness of the wrapped load 100 and anyway such as to not deform and damage the products which compose the load.

The operating parameters of the wrapping machine 60 comprise an unwinding speed for unwinding the film 50 from an unwinding unit 61 of the wrapping machine, a stretching or elongating ratio of the film 50 and a relative rotation speed between an unwinding unit 61 of the wrapping machine 60 and the load 100.

In the shown embodiment, the wrapping machine 60 is, for example, of the type with rotating platform 63, which rotatably supports the load 100 to be wrapped. The machine 60 comprises a column 62, which slidably supports the unwinding unit 61. The unwinding unit 61 is vertically moved with alternate motion and comprises a couple of pre-stretching rollers arranged to unwind the film from a reel and then stretch or elongate the film, and one or more diverting or return rollers arranged to divert the film towards the load 100. By suitably adjusting the difference between the rotation speeds of the pre-stretching rollers, it is possible to stretch by a set amount the film coming out from the wrapping apparatus. By adjusting the rotation speed of the pre-stretching rollers it is also possible to vary the unwinding speed of the film from the reel, i.e. the speed of the film coming out from the unwinding unit 61. The unwinding speed also depends on the rotation speed of the rotating platform 63.

Thus, the measuring device 1 and the measuring system 40 of the invention allow in a fast, simple and automatic manner to have precise and accurate information about the values of the wrapping force F of the film 50 around the load 100 in different critical points of the load 100, so as to verify the absence of values of wrapping or tightening force capable to damage the grouped products which compose the load and/or to verify the absence of torsional forces which could deform the load and affect the stability thereof.

The torsional forces on the load are generated, as known, by a wrapping force that is not uniform along the load perimeter, but is significantly variable at different points of said load.

In addition to this, the measuring device 1 and the measuring system 40 of the invention allow determining in an easy, fast and inexpensive manner the operating parameters of the wrapping machine 60 that are required to carry out an optimal wrapping of the load 100, according to shape and dimensions thereof and according to shape and composition (material, structure) of the products.

The measuring method of the invention provides the use of one or more measuring devices 1 to detect and measure a wrapping force F of a film 50 made of stretchable plastic material wrapped around a load 100 by a wrapping machine 60 provided with a wrapping unit 61.

The method provides the following steps:
  associating and fixing at least one measuring device 1 to the load 100 at one longitudinal edge 101 or at a flat wall 102 of said load 100;
  wrapping the load 100 with the film 50;
  detecting a signal that is transmitted by the measuring device 1 and related to a wrapping force F exerted by the wrapped film 50 on the load 100 and the measuring device 1.

It is also provided to associate to the load 100 a plurality of measuring devices 1 fixed at the edges 101 and/or at flat walls 102 of the load 100 and to detect the respective signals that are transmitted by said plurality of measuring devices 1 and related to respective wrapping forces exerted on the measuring devices 1 by the film 50.

The method provides, during the detection of the signals related to the wrapping force, to modify the operating parameters of the wrapping machine 60 for varying the wrapping force F exerted by the film 50 until reaching a predefined wrapping value. The operating parameters comprise an unwinding speed for unwinding the film 50 from the unwinding unit 61 and/or a stretching ratio of the film 50 and/or a relative rotation speed between load 100 and unwinding unit.

The invention claimed is:

1. A measuring device for detecting and measuring a wrapping force of a film that is made of stretchable plastic material and wrapped around a load, the measuring device comprising a first angular element that can be associated and fixed to at least one of an edge and a flat wall of said load, at least one force sensor that is fixed to said first angular element, a second angular element that is fixed to and supported by said force sensor, and a control unit that is connected to said force sensor and arranged to receive therefrom a signal relating to at least one wrapping force exerted on said second angular element by said film that is wrapped around said load and said measuring device.

2. The measuring device according to claim 1, further comprising a plurality of force sensors that are fixed to said first angular element, are spaced apart along a longitudinal extension direction, support said second angular element and are connected to said control unit.

3. The measuring device according to claim 1, wherein said first angular element comprises two first flat portions that are substantially orthogonal to each other and joined at a first joining edge, said force sensor being fixed to said first joining edge.

4. The measuring device according to claim 1, wherein said second angular element comprises two second flat portions that are orthogonal to each other and joined at a second joining edge, said second angular element being fixed to said force sensor at said second joining edge.

5. The measuring device according to claim 1, further comprising a fixing arrangement for removably attaching said measuring device to said load.

6. The measuring device according to claim 5, wherein said fixing arrangement comprises a plurality of hooks, that are spaced apart and fixed to longitudinal borders of said first angular element, and flexible elements that are connected to said hooks and can be wrapped around said load.

7. The measuring device according to claim 1, further comprising at least one supporting element for associating said measuring device to a flat wall of said load.

8. The measuring device according to claim 1, wherein said force sensor comprises a load cell or a force transducer.

9. A system for detecting and measuring a wrapping force of a film that is made of stretchable plastic material and wrapped around a load, the system comprising:
   at least one measuring device comprising:
      a first angular element that can be associated with, and fixed to, at least one of an edge and a flat wall of said load;
      at least one force sensor that is fixed to said first angular element;
      a second angular element that is fixed to and supported by said force sensor; and
      a control unit that is connected to said force sensor and arranged to receive therefrom a signal relating to at least one wrapping force exerted on said second angular element by said film that is wrapped around said load and said measuring device; and
   an external receiving unit, which is arranged to receive a signal transmitted from said measuring device and relevant to a wrapping force exerted by said wrapped film on said load and said measuring device.

10. The system according to claim 9, wherein said external receiving unit comprises one of a fixed computer, a laptop computer, and a data mobile transceiver.

11. The system according to claim 9, further comprising a plurality of measuring devices fixed to at least one of edges and flat walls of said load for detecting and measuring in real time wrapping forces exerted by said film in respective different points of said load.

12. A method for detecting and measuring a tightening force of a film made of stretchable plastic material that is wrapped around a load by means of a wrapping machine that is provided with an unwinding unit, the method using at least one measuring device comprising a first angular element that can be associated with, and fixed to, at least one of an edge and a flat wall of said load, at least one force sensor that is fixed to said first angular element, a second angular element that is fixed to and supported by said force sensor, and a control unit that is connected to said force sensor and arranged to receive therefrom a signal relating to at least one wrapping force exerted on said second angular element by said film that is wrapped around said load and said measuring device, the method comprising:
   associating and fixing said measuring device to at least one of an edge and a flat wall of said load;
   wrapping said load with said film; and
   detecting a signal that is transmitted by said measuring device and related to a wrapping force exerted by said wrapped film on said load and said measuring device.

13. The method according to claim 12, further comprising associating to said load a plurality of measuring devices that are fixed to at least one of edges and flat walls of said load and detecting respective signals that are transmitted by said plurality of measuring devices and related to respective wrapping forces exerted by said film on said measuring devices.

14. The method according to claim 12, further comprising, after said detecting, modifying operating parameters of said wrapping machine for varying said wrapping force exerted by said film until reaching a preset value of said wrapping force.

15. The method according to claim 14, wherein said operating parameters include at least one of an unwinding speed for unwinding said film from said unwinding unit, a stretching ratio of said film, and a relative rotation speed between said unwinding unit and said load.

* * * * *